(12) United States Patent
Zeng et al.

(10) Patent No.: US 10,933,829 B2
(45) Date of Patent: Mar. 2, 2021

(54) KNEE BOLSTER

(71) Applicants: Hyundai Motor Company, Seoul (KR); KIA Motors Corporation, Seoul (KR)

(72) Inventors: Samuel Zeng, Rochester Hills, MI (US); Michael Guerrero, Ypsilanti, MI (US)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 266 days.

(21) Appl. No.: 16/171,600

(22) Filed: Oct. 26, 2018

(65) Prior Publication Data

US 2020/0130628 A1 Apr. 30, 2020

(51) Int. Cl.
*B60R 21/045* (2006.01)
*B60R 21/00* (2006.01)

(52) U.S. Cl.
CPC .... *B60R 21/045* (2013.01); *B60R 2021/0051* (2013.01)

(58) Field of Classification Search
CPC .................. B60R 20/21; B60R 21/045; B60R 2021/0051; B60R 21/05
USPC .......................................... 280/752; 188/371
See application file for complete search history.

(56) References Cited

U.S. PATENT DOCUMENTS

| | | | | |
|---|---|---|---|---|
| 4,709,943 A * | 12/1987 | Yoshimura | ............ | B60R 21/045 180/90 |
| 5,037,130 A * | 8/1991 | Okuyama | ............ | B60R 21/045 280/752 |
| 5,273,314 A * | 12/1993 | Sakakibara | ........... | B60R 21/045 188/377 |
| 5,456,494 A * | 10/1995 | Witkovsky | ............ | B60R 21/045 188/377 |
| 5,482,319 A * | 1/1996 | Yoshimura | ............ | B60R 21/045 280/752 |
| 5,518,270 A * | 5/1996 | Hanada | ................. | B60R 21/045 280/748 |
| 6,793,246 B2 * | 9/2004 | Horsch | ................. | B60R 21/045 280/751 |

(Continued)

FOREIGN PATENT DOCUMENTS

| | | |
|---|---|---|
| JP | 2012-076587 A | 4/2012 |
| JP | 5465705 B | 4/2014 |
| KR | 10-2007-0084660 A | 8/2007 |

*Primary Examiner* — James A Shriver, II
*Assistant Examiner* — Hilary L Johns
(74) *Attorney, Agent, or Firm* — Brinks Gilson & Lione

(57) ABSTRACT

A knee bolster system for absorbing an impact energy of an occupant's knee is provided with a multi-level force load limiter. The multi-level force load limiter includes three force load limiters. A first force load limiter includes a contact plate for receiving an impact force by the occupant's knee during a vehicle collision. A second force load limiter includes a torsional deflection rod for deforming torsionally by allowing relative rotation, and a third force load limiter includes a locking gear and a female locking base for locking further rotation of a rotational arm after rotation of the torsional deflection rod in the second force load limiter by a predetermined angle based on rotation of the rotational arm. Accordingly, the multi-level force load limiter can create a higher torsion force on the rotational arm of the knee bolster system.

18 Claims, 8 Drawing Sheets

(56) References Cited

U.S. PATENT DOCUMENTS

| | | | | |
|---|---|---|---|---|
| 8,408,590 B2* | 4/2013 | Kalisz | ................... | B60R 21/04 |
| | | | | 280/730.1 |
| 2004/0251670 A1* | 12/2004 | Wang | ................... | B60R 21/045 |
| | | | | 280/753 |
| 2005/0062276 A1* | 3/2005 | Nagata | ................ | B60R 21/045 |
| | | | | 280/752 |
| 2005/0067824 A1* | 3/2005 | Kim | .................... | B60R 21/045 |
| | | | | 280/752 |
| 2005/0110250 A1* | 5/2005 | Funakura | ............ | B60R 21/045 |
| | | | | 280/730.1 |
| 2006/0038389 A1* | 2/2006 | Ko | ...................... | B60R 21/045 |
| | | | | 280/752 |
| 2007/0222197 A1* | 9/2007 | Makita | ................... | B60R 21/05 |
| | | | | 280/752 |
| 2009/0008962 A1* | 1/2009 | Sauer | .................. | B60R 21/045 |
| | | | | 296/187.03 |

* cited by examiner

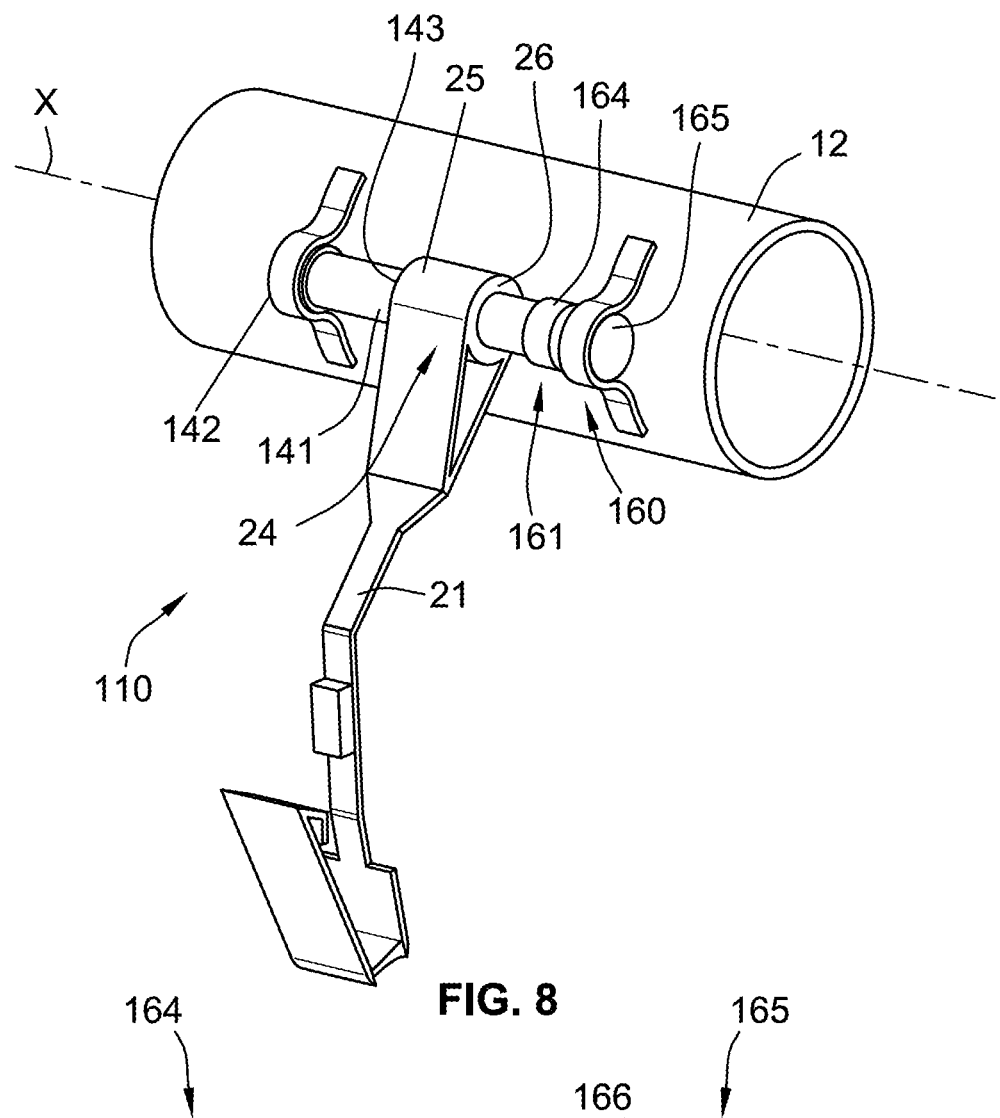
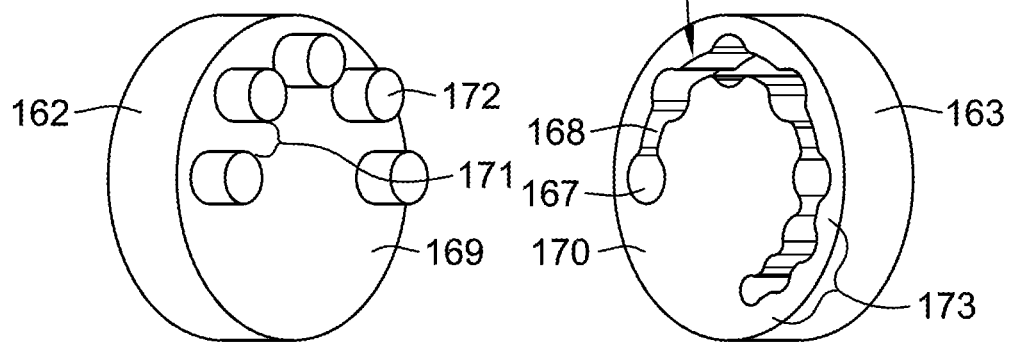
FIG. 8
FIG. 9  FIG. 10

KNEE BOLSTER

FIELD

The present disclosure relates to a knee bolster system for protecting the knees of an occupant during a vehicle collision. More specifically, the present disclosure relates to the knee bolster system with multi-level force load limiters that can absorb an impact energy.

BACKGROUND

This statements in this section merely provide background information related to the present disclosure and may not constitute prior art. Vehicles are typically provided with a knee bolster for protecting the knees of vehicle occupants during the event of a collision. The knee bolster is generally installed on or adjacent a vehicle's front dashboard, such as on either side of the vehicle's steering column extending from the front dashboard. In a conventional knee bolster system, an impact force can be absorbed by a simple shock absorbing plate. Accordingly, it is not enough for the knee bolster system to fully absorb the impact force exerted by the occupant's knee.

During the event of the vehicle's collision, the impact force against the knee bolster can cause serious injury to the occupants sitting on front seats in the vehicle because the conventional knee bolster system cannot absorb the impact force exerted by the occupant's knee enough. Accordingly, various types of knee bolster systems have been developed and introduced for avoiding serious injury of the occupants. Recently, a knee bolster system for controlling the deflection of the knee bolster relative to the impact force has been developed. However, we have discovered that the introduced knee bolster system for controlling the deflection of the knee bolster is not enough to limit the intrusion of the occupant's knee during the event of the vehicle collision.

The above information disclosed in this Background section is only for enhancement of understanding of the background of the present disclosure and therefore it may contain information that does not form the prior art that is already known to a person of ordinary skill in the art.

SUMMARY

The present disclosure relates to a knee bolster system for protecting knees of vehicle occupants during the event of a vehicle collision.

According to one form of the present disclosure, a knee bolster system for a vehicle having fixtures comprises a first force load limiter, a second force load limiter and a third force load limiter as a multi-level force load limiter. The first force load limiter includes a rotational arm having an upper portion and a lower portion, and a contact plate is coupled to the lower portion of the rotational arm. The contact plate is configured to receive an impact force from an occupant during a collision. The second force load limiter includes a first rod. A first end of the first rod is coupled to the fixture in a non-rotating manner and a second end of the first rod is coupled to the rotational arm in a non-rotating manner. The first rod is configured to deflect torsionally by allowing relative rotation. The third force load limiter includes a locking gear and a female locking base. The locking gear and the female locking base is coupled each other in a rotating manner, and the third force load limiter is configured to lock the rotational arm after rotation of the first rod in the second force load limiter by a predetermined angle based on rotation of the rotational arm.

According to one form of the present disclosure, a tubular end of the rotational arm includes a first lateral side and a second lateral side, and the tubular end of the rotational arm pivots relative to the fixtures according to a longitudinal axis. The second end of the first rod is connected to the first lateral side of the rotational arm in a non-rotating manner. The second lateral side of the rotational arm is formed as the female locking base for coupling with the locking gear protruded from an outer surface of a second rod in the third force load limiter. A second end of the second rod is connected to the second fixture in a non-rotating manner.

According to one form of the present disclosure, the female locking base includes a groove, and the locking gear includes a protrusion. An engagement of the protrusion and the groove in the third force load limiter prevents further rotation of the rotational arm.

According to one form of the present disclosure, the lower portion of the rotational arm includes a stop pad and the contact plate includes a stopper on a surface faced to the stop pad, and the stop pad is configured for stopping the deformation of the contact plate by contacting with the stopper.

According to another form of the present disclosure, the locking gear and the female locking base each have a circular disk shape, and the locking gear is fixedly attached to a second lateral side of the rotational arm and the female locking base is fixedly attached to the second fixture. The locking gear includes at least a knob on a first surface of the locking gear, and the female locking base includes at least a hole on a mating surface faced to the first surface of the locking gear. The knob of the locking gear is inserted into the hole of the female locking base, and a locking receiver includes a narrow channel connected between the holes for increasing a resistance of the rotational movement of the rotational arm.

According to one form of the present disclosure, the knee bolster system is operable to receive the impact force from a knee or knees of the occupant and resist the impact force in three stages corresponding to three force levels including a first level, a second level higher than the first, and a third level higher than the second. In a first stage the first force load limiter deforms to resist the impact force at the first level, and in a second stage deformation of the first force load limiter includes deformation of the second force load limiter to provide resistance at the second level. Furthermore, in a third stage deformation of the first force load limiter induces rotation of the third force load limiter provide resistance at the third level. The third force load limiter prevents further rotation of the rotational arm for any force above the third level.

According to another form of the present disclosure, a knee bolster system for a vehicle having fixtures, the knee bolster system includes a first force load limiter, a second force load limiter, and a third force load limiter as a multi-level force load limiter. The first force load limiter includes a rotational arm having an upper portion and a lower portion, and a contact plate is coupled to the lower portion of the rotational arm. The contact plate is configured to receive an impact force from an occupant during a collision. The second force load limiter includes a first rod. A first end of the first rod is coupled to the fixture in a non-rotating manner and a second end of the first rod is coupled to the fixture in a non-rotating manner. In addition, the first rod is configured to deflection torsionally by allowing relative rotation. The third force load limiter includes a torsional cylinder. The torsional cylinder includes a locking gear and a female locking base, which are coupled in a rotational manner and configured to lock the rotational arm after rotation of the first rod in the second force load limiter by a predetermined angel based on rotation of the rotational arm. The locking gear includes at least a knob, and the female locking base includes at least a hole for receiving the knob.

According to one form of the present disclosure, the number of the hole in the female locking base is at least one more than the number of the knob of the locking gear, and the more hole in the female locking base is defined as an extra holes. A diameter of the extra hole in the female locking base becomes a smaller for stopping the rotation of the locking gear.

According to one form of the present disclosure, each hole is connected by a narrow channel for increasing a resistance when the locking gear is rotated relative to the female locking base.

According to one form of the present disclosure, the knee bolster system is configured for creating a higher torsion force to the rotational arm by accumulating the torsion forces in each force load limiter.

According to another form of the present disclosure, a method for absorbing an impact energy by a knee bolster system for a vehicle having fixtures includes a step of receiving an impact force from an occupant by a contact plate; deforming the contact plate until the contact plate is contacted to a stop pad of a rotational arm; deflecting torsionally a first rod by allowing relative rotation according to a longitudinal axis of the first rod; and locking the rotation of the rotational arm after torsional deflection of the first rod by a predetermined angle based on rotation of the rotational arm. The knee bolster system is configured to absorb the impact energy by accumulating the received impact forces from each stage of a first, a second and a third force load limiters.

Further areas of applicability will become apparent from the description provided herein. Everyone should understand that the description and specific examples presented herein are for the purpose of illustration only and are not intended to limit the scope of the present disclosure.

DRAWINGS

In order that the disclosure may be well understood, there will now be described various forms thereof, given by way of example, reference being made to the accompanying drawings, in which:

FIG. 8 is a perspective view of a knee bolster system in accordance with other form of the present disclosure;

FIG. 9 is a perspective view of a locking gear of a third force load limiter in FIG. 8 in accordance with other form of the present disclosure;

FIG. 10 is a perspective view of a female locking base of the third force load limiter in FIG. 9 in accordance with other form of the present disclosure;

Figure 11:
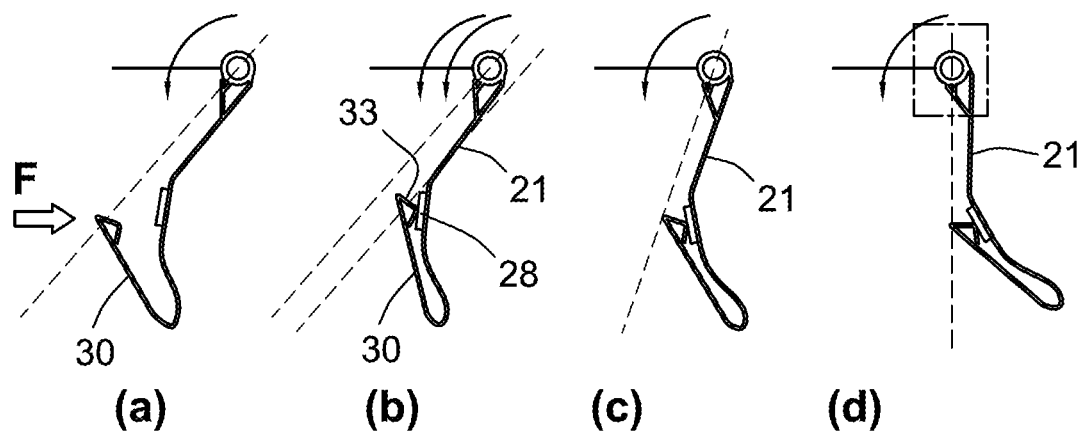
Figure 12:
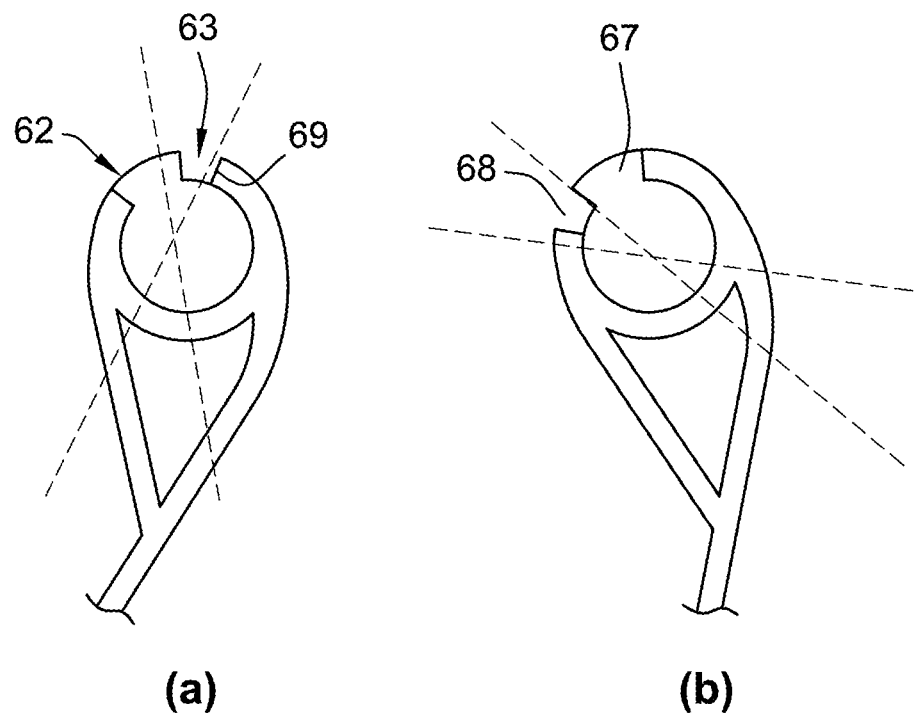
Figure 13:
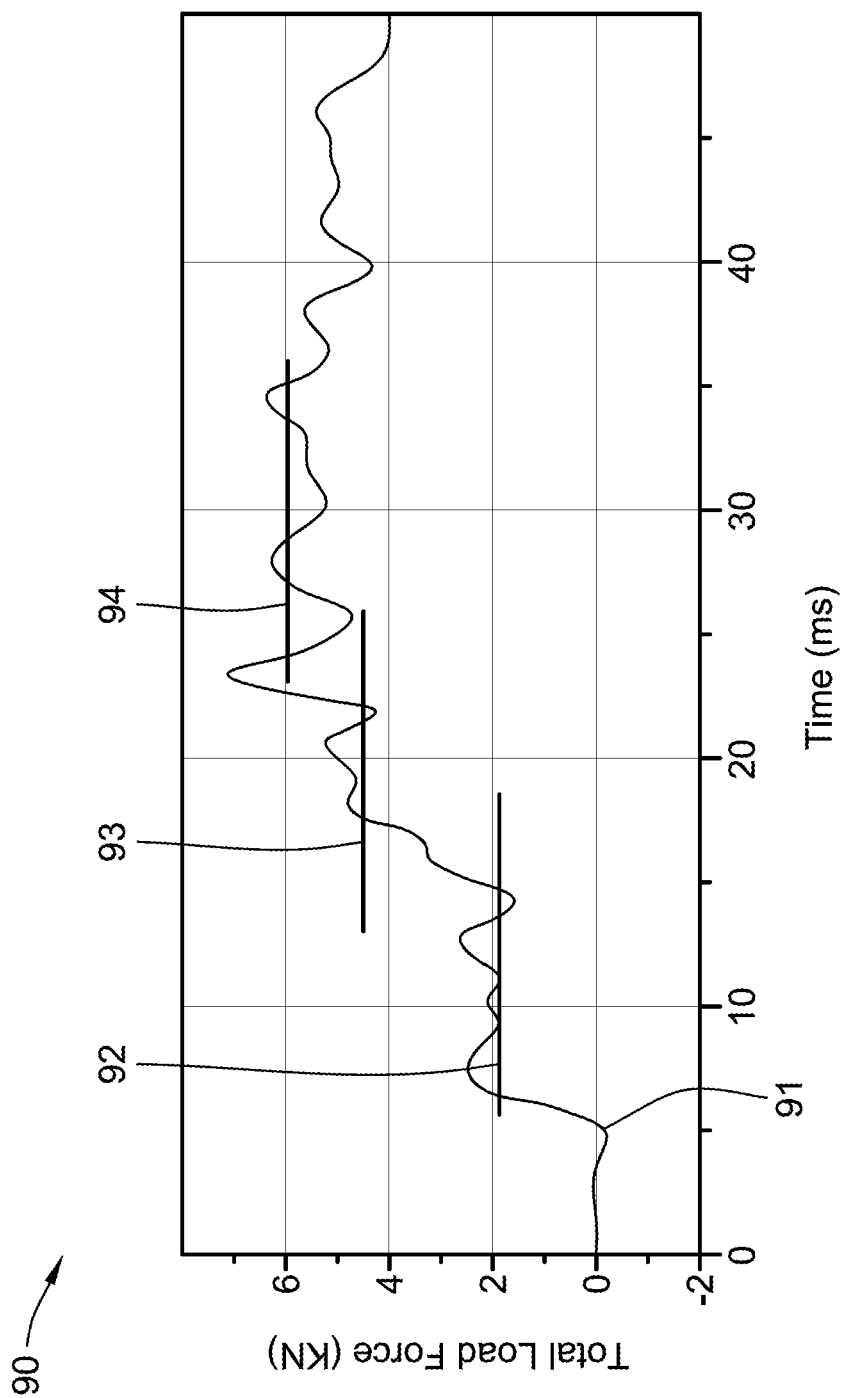

FIG. 11($a$) through ($d$) is a perspective view of an operating process of the knee bolster system in accordance with the present disclosure;

FIGS. 12 ($a$) and ($b$) are a detail view of the operating process of the third force load limiter in FIG. 11($d$); and FIG. 13 illustrates a graph of a total load force in each of the first, second and third force load limiters in the knee bolster system of the present disclosure.

The drawings described herein are for illustration purposes only and are not intended to limit the scope of the present disclosure in any way.

DETAILED DESCRIPTION

The following description is merely exemplary in nature and is in no way intended to limit the present disclosure or its application or uses. It should be understood that throughout the drawings, corresponding reference numerals indicate like or corresponding parts and features.

Figure 1:
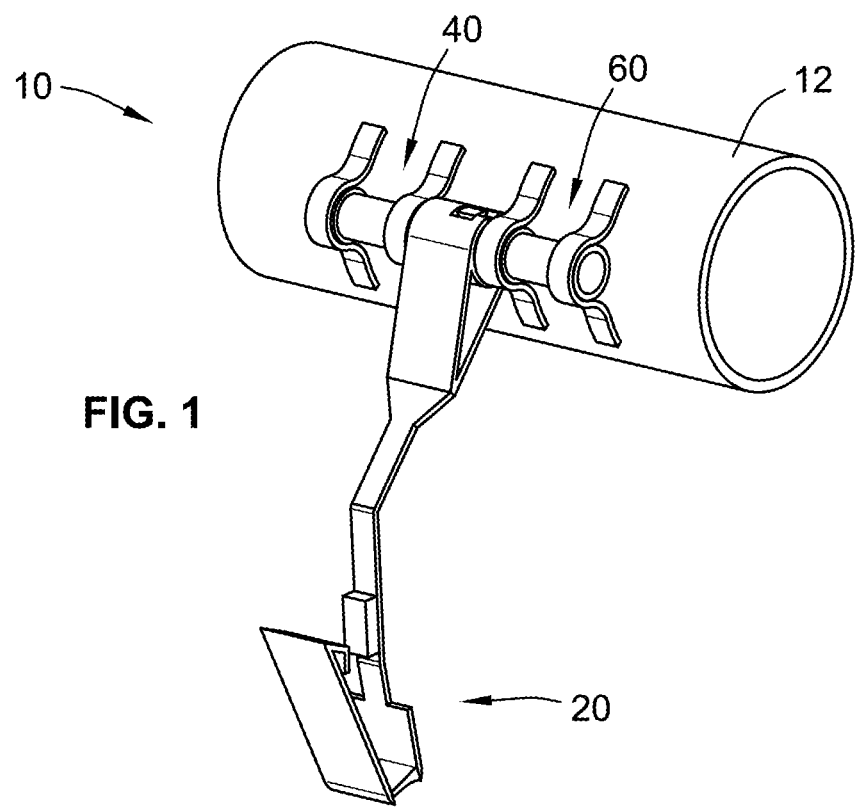
FIG. 1 is a perspective view of a knee bolster system attached to a cross member in a vehicle in accordance with the present disclosure.
Figure 2:
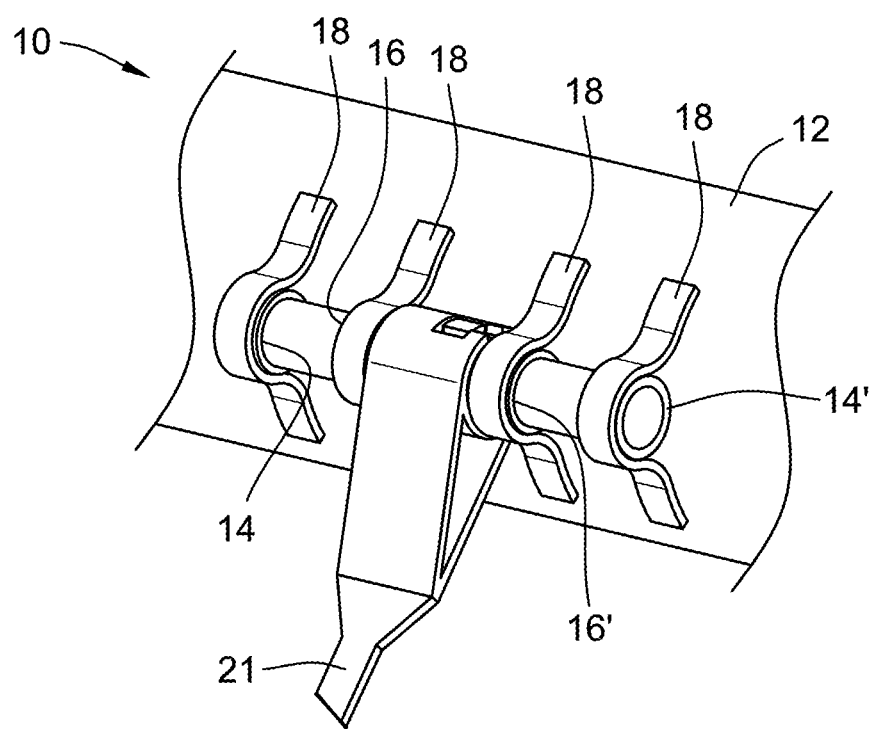
FIG. 2 is a detail view of a second and third force load limiter of the knee bolster system in accordance with the present disclosure.

Referring to FIG. 1, a knee bolster 10 for mounting within a vehicle (not shown) is illustrated. As known and understood by those skilled in the art, the knee bolster 10 is secured to a cross member 12 of the vehicle and oriented such that the knee bolster 10 can extend toward a passenger compartment of the vehicle so as to protect a vehicle occupant's knee or knees in the event that the occupant's knee or knees are forcibly moved into the area of the vehicle occupied by the knee bolster 10 during a vehicle collision. The cross member 12 may be a portion of the vehicle frame, a rigid member connected to the frame, or other supporting member. In one form, the cross member 12 is a cross-car beam. As shown in FIGS. 1 and 2, the knee bolster 10 can be secured to the cross member 12 in the vehicle by various connecting means such as a clamping strap 18.

In FIG. 1, the knee bolster 10 includes a first force load limiter 20, a second force load limiter 40 and a third force load limiter 60 as a multilevel force load limiter. The knee bolster 10 with the multilevel force load limiter can control the force limit of the occupant's knee according to different size of the occupants in a vehicle. In addition, the multi-level force load limiter can be satisfied in a wide range of collision regulations such as a frontal impact (Federal Motor Vehicle Safety Standards, FMVSS 208) or NCAP (New Car Assessment Program) for various occupant sizes. Accordingly, the knee bolster 10 with the multi-level force load limiter in the present disclosure may not be required to tune among various vehicles.

Figure 3:
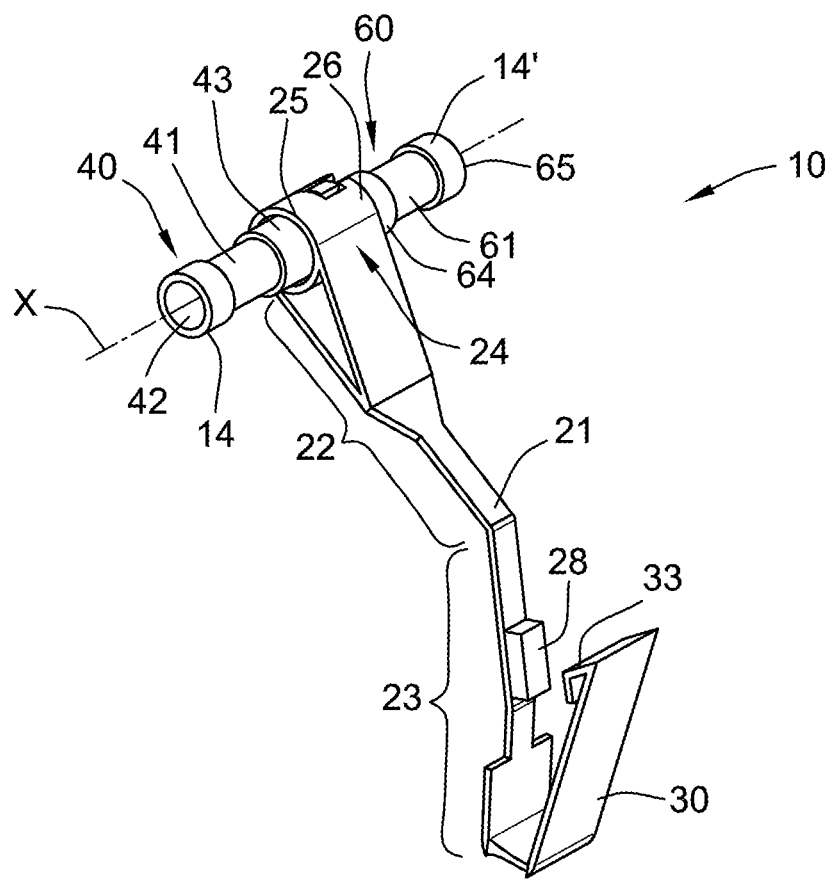
FIG. 3 is a perspective view of the knee bolster system in accordance with the present disclosure.

Referring to FIG. 3, the first force load limiter 20 includes a rotational arm 21 having an upper portion 22 and a lower portion 23. The rotational arm 21 is made of a steel. However, other suitable materials in accordance with other form of the present disclosure may be implemented. A tubular end 24 of the rotational arm 21 includes a first lateral side 25 for connecting with the second force load limiter 40 in a non-rotating manner, and a second lateral side 26 for coupling with the third force load limiter 60 in a rotating manner. The first and second lateral sides 25, 26 of the rotational arm 21 are a cylindrical shape and respectively engaging with the second and third force load limiters 40, 60 respectively. However, other suitable shapes for the tubular end 24 of the rotational arm 21 in accordance with other forms of the present disclosure may be implemented.

Figure 5:
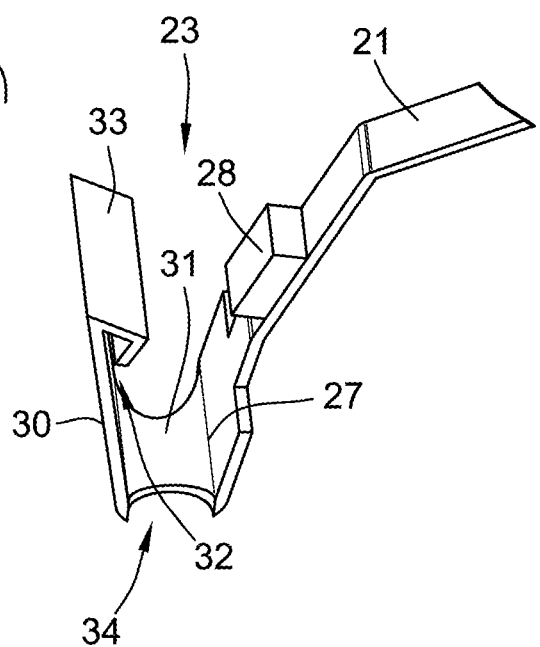
FIG. 5 is a top view of the lower portion of the first force load limiter in accordance with the present disclosure.

As shown in FIGS. 3 and 5, the lower portion 23 of the rotational arm 21 may be bent according to the location and/or angle of the knee bolster 10 when the knee bolster 10 is installed in the vehicle for effectively limiting the knee force of the occupant. However, other suitable geometrical shapes of the rotational arm 21 in accordance with other forms of the present disclosure may be implemented based on a space in the vehicle in which the knee bolster 10 is placed. A bottom edge 27 of the rotational arm 21 is fixedly attached to a contact plate 30. The contact plate 30 is generally integrally formed with the rotational arm 21 as a single piece. As shown in FIGS. 3 and 5, the contact plate 30 is made of a sheet metal. However, other suitable materials in accordance with other forms of the present disclosure may be implemented. In addition, the contact plate 30 is generally wider than the rotational arm 21 in cross-car direction for allowing the contact plate 30 for being contacted by the occupant's knee in a bigger area of the contact plate 30 during the event of the vehicle collision.

Figure 4:
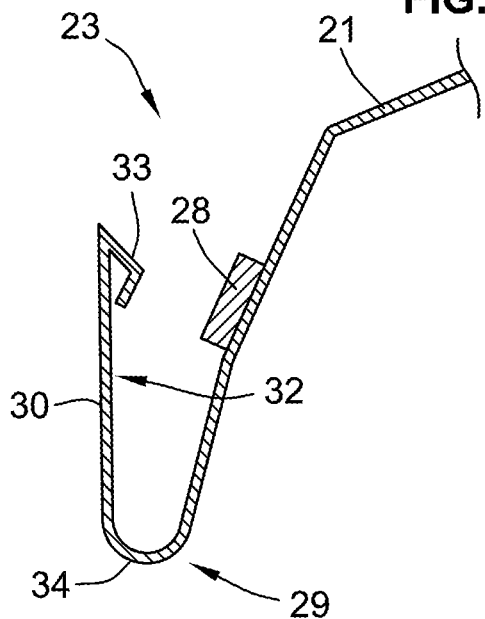
FIG. 4 is a cross-car view of a lower portion of a first force load limiter in accordance with the present disclosure.

In FIG. 4, A connected area 29 between the lower portion 23 of the rotational arm 21 and the contact plate 30 are generally U-shape in cross-car view. The U-shaped design of the connected area 29 is configured for allowing the contact plate 30 to deform and contact to a stop pad 28 of the rotational arm 21 when the contact plate 30 is hit by the occupant's knee during the event of the vehicle collision. Furthermore, the contact plate 30 is configured for receiving an impact load exerted by the knees of the occupant when the occupant's knees impact the knee bolster 10.

In FIG. 5, the contact plate 30 includes a narrow section 31 at a bottom end 34 of the connected area 29 between the rotational arm 21 and the contact plate 30. The narrow section 31 of the contact plate 30 is also configured for easily deforming the contact plate 30 when the occupant's knees impact the knee bolster 10. The contact plate 30 further includes a stopper 33 attached to a surface 32 faced to the stop pad 28 of the rotational arm 21. The stopper 33 is generally integrally formed with the contact plate 30 as a single piece. According to other forms of the present disclosure, however, the stopper 33 may be attached to the contact plate 30 as a separate piece. The stopper 33 on the contact plate 30 is configured to stop the deformation of the contact plate 30 by being contacted to the stop pad 28 of the rotational arm 21 when the occupant's knees impact the contact plate 30.

Referring back to FIG. 3, the second force load limiter 40 includes a first rod 41, which is engaged with the first lateral side 25 of the rotational arm 21 in the non-rotational manner. In FIG. 3, for example, the first rod 41 is generally cylindrical or tubular shape and made of a steel. However, other suitable shapes and/or materials of the first rod 41 in accordance with other forms of the present disclosure may be implemented. At a first end 42 of the first rod 41 is non-rotationally secured with a fixture 14 attached to the cross member 12 of the vehicle. (see FIGS. 1 and 2). As described above, a second end 43 of the first rod 41 is non-rotationally secured to the first lateral side 25 of the rotational arm 21. Accordingly, both ends 42, 43 of the first rod 41 are fixedly secured in the non-rotating manner.

In FIGS. 1-3, a guide 16 is rotationally coupled with the first rod 41 at near location of the second end 43 of the first rod 41 for supporting the first rod 41. Generally, the guide 16 is fixedly attached to the cross member 12 of the vehicle. Accordingly, when the rotational arm 21 of the first force load limiter 20 is rotated, the first cylindrical rod 41 is torsionally deflected because the first end 42 of the first rod 41 is non-rotatably secured and the second end 43 of the first rod 41 is also non-rotatably fixed with the first lateral side 25 of the rotational arm 21.

As described above, in FIG. 3, the first rod 41 of the second force load limiter 40 deflects torsionally by allowing relative rotation between both ends 42, 43 about a longitudinal axis X. The first cylindrical rod 41 is concentric with the rotational axis of the rotational arm 21 of the first force load limiter 20 according to the longitudinal axis X. Accordingly, the first rod 41 is configured to control the force load limit by its relative rotation or torsional deformation, and absorb some amounts of the impact energy of the occupant's knee during the vehicle collision. In accordance with other forms of the present disclosure, the first rod 41 can be other designs which have a torsional deformation such as a torsion bar or torsional spring 141.

According to another form of the present disclosure, the torsional spring 141 as the first rod 41 is illustrated in FIG. 8. As shown in FIG. 8, a first and second end 142, 143 of the torsional spring 141 are non-rotatably secured to the fixture 14 and the first lateral side 25 of the rotational arm 21, respectively. As described above, accordingly, when the rotational arm 21 of the first force load limiter 20 is rotated, the torsional spring 141 is torsionally deflected according to the longitudinal axis X, and absorbs the force exerted by the occupant's knee during the event of the vehicle collision.

Figure 6:
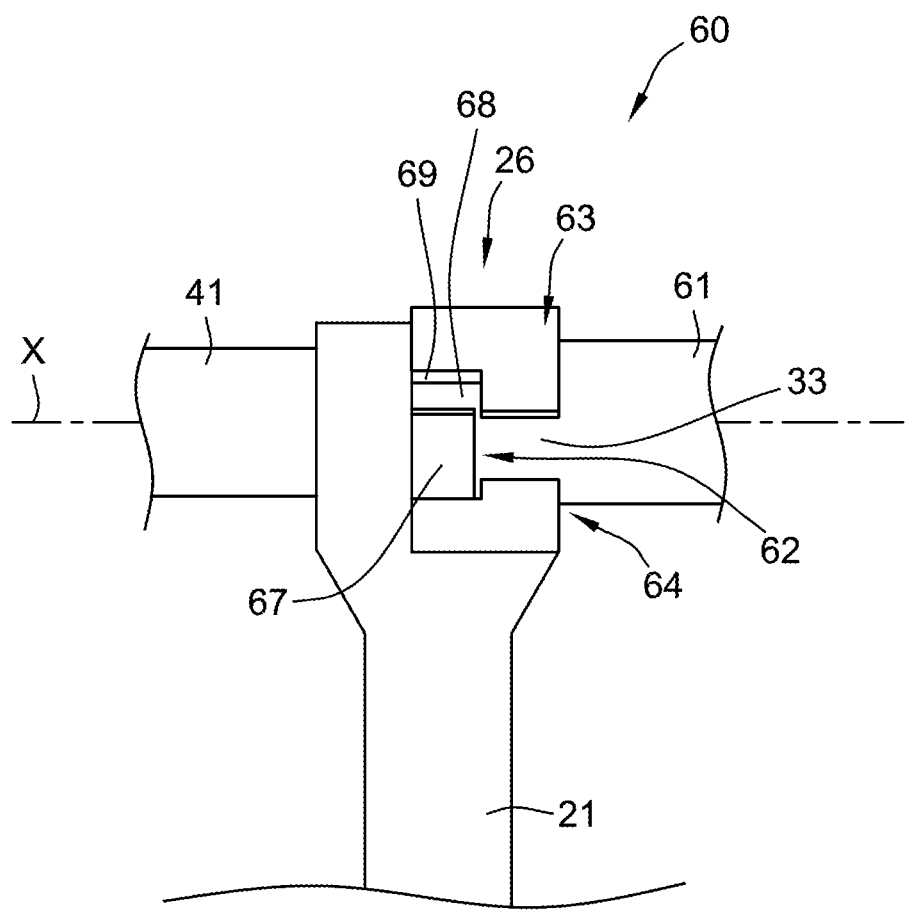
FIG. 6 is a detail view of a locking gear and a female locking base of the third force load limiter in accordance with the present disclosure.

Referring back to FIG. 3, the third force load limiter 60 includes a second rod 61, which has a locking gear 62. In addition, the second lateral side 26 of the rotational arm 21 is formed as a female locking base 63 for coupling with the locking gear 62 in a rotating manner. (See also FIG. 6). As shown in FIGS. 3 and 6, the second rod 61 is a bar or tubular shape and is made of a steel. Furthermore, the second rod 61 is concentric with the first rod 41 of the second force load limiter 40 according to the longitudinal axis X. In accordance with other forms of the present disclosure, other suitable shapes and/or materials of the second rod 61 may be implemented.

In FIGS. 3 and 6, a second end 65 of the second rod 61 is fixedly secured to a second fixture 14' in a non-rotating manner. The second fixture 14' is also fixedly attached to the cross member 12 of the vehicle. (See FIGS. 1 and 2). As shown in FIG. 7A, in accordance with another form of the present disclosure, a second end 65' of a second rod 61' is formed as a hexagonal shape for coupling with a fixture bracket 17 in a non-rotating manner. (See FIGS. 2A and 2C). In addition, the fixture bracket 17 is directly attached to the cross member 12 of the vehicle. (See FIG. 2A). Referring back to FIGS. 3 and 6, a first end 64 of the second rod 61 includes the locking gear 62, which protrudes from an outer surface 66 of the second rod 61. The locking gear 62 of the second rod 61 is rotatably coupled to the female locking base 63 formed on the second lateral side 26 of the rotational arm 21. Accordingly, the rotational arm 21 with the female locking base 63 is configured to rotatably move with respect to the second cylindrical rod 61 according to the longitudinal axis X. Furthermore, a second guide 16' is rotationally coupled with the second rod 61 at a location, which is near the first end 64 of the second rod 61 for supporting the second rod 61. Generally, the guide 16' is fixedly attached to the cross member 12 of the vehicle. (See FIGS. 1 and 2).

In FIGS. 3 and 6, when the torsional deformation of the first rod 41 in the second force load limiter 40 reaches certain extent corresponding to a predetermined angle of the rotational arm 21 (i.e. a predetermined rotation of the tubular end of the rotational arm), the locking gear 62 of the second rod 61 is engaged with the female locking base 63 for preventing the further rotation of the rotational arm 21. Accordingly, the locking gear 62 and the female locking base 63 are interlocked each other and the interlocking engagement can create a higher torsion force of the rotational arm 21 because the torsion force in the second and third force load limiters 40, 60 are accumulated.

Figure 7:
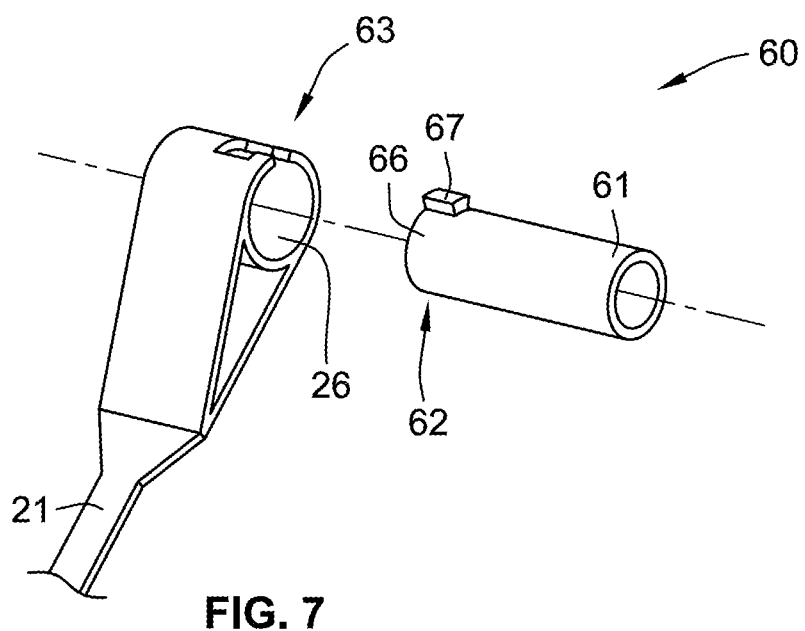
FIG. 7 is an exploded view of the locking gear and the female locking base of FIG. 6.
Figure 7A:
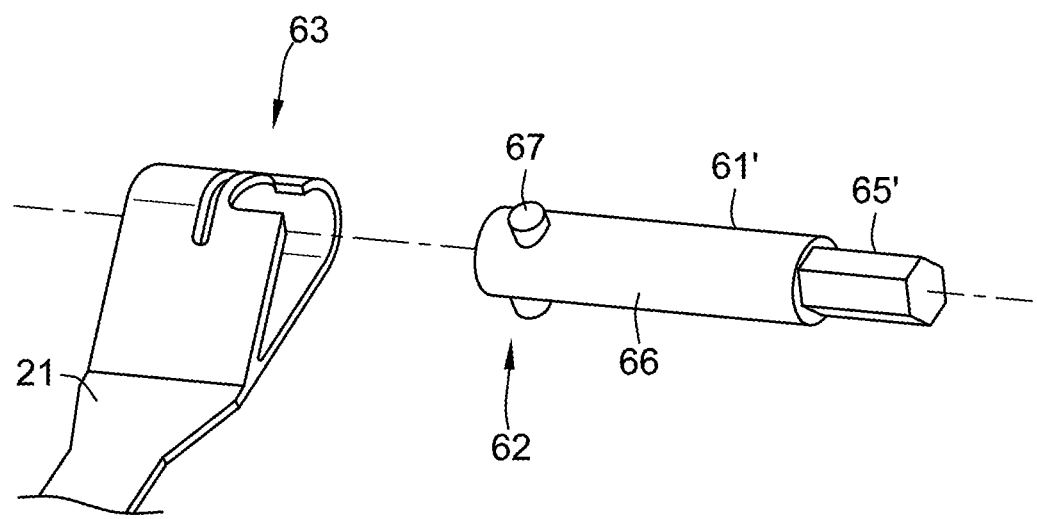
FIG. 7A is an exploded view of the locking gear and the female locking base of FIG. 6 in accordance with another form of the present disclosure.

According to an exemplary form of the present disclosure, as shown in FIGS. 6 and 7, the locking gear 62 is formed as a protrusion 67 on the outer surface 66 of the second rod 61, and the female locking base 63 is formed as a groove 68 on the second lateral side 26 in the tubular end 24 of the rotational arm 21. The protrusion 67 of the second rod 61 is initially engaged with the groove 68 of the female locking base 63. Accordingly, the female locking base 63 with groove 68 rotationally moves according to the protrusion 67 of the locking gear 62 by the predetermined angle of the rotational arm 21 with respect to the longitudinal axis X. After rotation of the first rod 41 with the predetermined angle, the protrusion 67 is contacted to an edge 69 of the groove 68, and the rotational movement of the rotational arm 21 is stopped. Accordingly, the third force load limiter 60 prevents further rotation of the rotational arm 21 and locks the rotational movement of the rotational arm 21.

FIGS. 8 to 10 show another exemplary form of a knee bolster system 110. The knee bolster 110 can be configured generally as described above with respect to FIGS. 1 through 7 and provides the full advantage of the present disclosure. In this regard, the knee bolster 110 in FIG. 8 is similar to the knee bolster 10 of the form of FIGS. 1 to 7. The knee bolster 110, however, includes a different third force load limiter 160.

As shown in FIGS. 8 to 10, the third force load limiter 160 includes a torsional cylinder 161. The torsional cylinder 161 is generally a circular disk shape with larger diameter and made of a steel. However, other suitable shapes and/or materials of the torsional cylinder 161 in accordance with other forms of the present disclosure may be implemented. As shown in FIG. 8, the torsional cylinder 161 includes a first part 164 and a second part 165, which are engaged each other.

In FIGS. 9-10, the first part 164 of the torsional cylinder 161 is defined as a locking gear 162 including at least a knob 172. The second part 165 of the torsional cylinder 161 is defined as a female locking base 163. As shown in FIG. 9, the knob 172 protruded from a first surface 169 of the first part 164 is a cylindrical shape. In FIG. 9, for example, five cylindrical knobs 172 are protruded from the first surface 169 of the first part 164, which is faced to the second part 165 of the torsional cylinder 161. However, other suitable shapes or number of the knob 172 in accordance with other forms of the present disclosure may be implemented. The knobs 172 are placed each other with a space 171 according to the circumferential line of the first part 164. The first part 164 is fixedly connected to the second lateral side 26 on the tubular end 24 of the rotational arm 21, and the torsional cylinder 161 is concentric with the tubular end 24 of the rotational arm 21 according to the longitudinal axis X.

Accordingly, when the rotational arm 21 is rotated according to the longitudinal axis X, the first part 164 of the torsional cylinder 161 is rotated with the rotational arm 21 together.

The female locking base 163 of the torsion cylinder 161 includes at least a locking receiver 166 for receiving the locking gear 162 of the first part 164. As shown in FIG. 10, the locking receiver 166 on a mating surface 170 of the second part 165 faced to the first surface 169 of the first part 164 includes at least a hole 167. In FIG. 10, for example, each hole 167 is connected by a narrow channel 168, respectively. The narrow channels 168 connected between each hole 167 are configured for creating a resistance when the rotational arm 21 is rotated by the predetermined angle. The construction or arrangement of the locking receiver 166 may be changed according to the shapes or arrangement of the locking gear 162. In addition, the female locking base 163 is fixedly attached to the cross member 12 by the fixture 14' with the clamping strap 18 or other attaching methods. (See FIG. 8).

As shown in FIGS. 9-10, each knob 172 of the locking gear 162 is inserted into each of the hole 167 of the locking receiver 166. The diametric size of each hole 167 receiving each knob 172 and the diametric size of each knob 172 is substantially same for fitting well into the hole 167. In the construction of the locking receiver 166, the number of the holes 167 in the female locking base 163 is at least one more than the number of the knobs 172 of the locking gear 162. At least one more hole, which is not engaged with any knob 172, is defined as an extra hole 173. The number of the extra hole 173 can be determined according to the predetermined angle of the rotation of the rotational arm 21 in the second force load limiter 40. In FIG. 10, for example, the locking receiver 166 has three extra holes 173 and the extra holes 173 become smaller diametric size than the non-extra holes 167. Accordingly, due to the extra holes 173 with the smaller diametric size in the locking receiver 166 at the end, the female locking base 163 is configured to lock the rotation of the rotational arm 21 after rotation of the first rod 41 with the predetermined angle. However, other suitable diametric sizes of the knob 172 and the holes 167 including the extra holes 173 may be implemented according to other form of the present disclosure for stopping the rotation of the rotational arm 21.

Referring back to FIGS. 8-10, the locking gear 162 and the female locking base 163 of the torsional cylinder 161 are rotatably coupled each other for allowing the rotational arm 21 to rotate in a predetermined angle. In addition, due to the narrow channel 168 between the holes 167 on the female locking base 163, the torsion cylinder 161 is configured for creating the rotational resistance between the locking gear 162 and the female locking base 163. As described above, the third force load limiter 160 of the knee bolster 110 is one of the highest level of the force load limiters because the torsional force is accumulated in the third force load limiter 160 with the second force load limiter 40. Accordingly, the knee bolster 110 with the third force load limiter 160 can stop the knee intrusion of the occupant who is bigger size.

According to another exemplary form of the present disclosure, the arrangement of the first part 164 and the second part 165 can be switched its position such that the first part 164 as the locking gear 162 is fixedly attached to the second fixture 14' and the second part 165 as the female locking base 163 is fixedly connected to the second lateral side 26 on the tubular end 24 of the rotational arm 21.

Referring back to FIGS. 1 and 2, the fixtures 14, 14' and the guides 16, 16' are cylindrical shapes and coaxially coupled with the second force load limiter 40 and the third force load limiter 60, respectively. However, other suitable shapes of the fixtures 14, 14' and the guides 16, 16' are implemented according to the coupled first rod 41 and the second rod 61 in other forms of the present disclosure. The fixtures 14, 14' and the guides 16, 16' are fixedly attached to the cross member 12 of the vehicle by a welding or a clamping strap 18. However, other suitable attaching means such as a fastening element can be implemented in accordance with other forms of the present disclosure. Accordingly, the knee bolster system 10, 110 in the present disclosure is fixedly mounted to the cross member 12 of the vehicle.

Figure 2A:
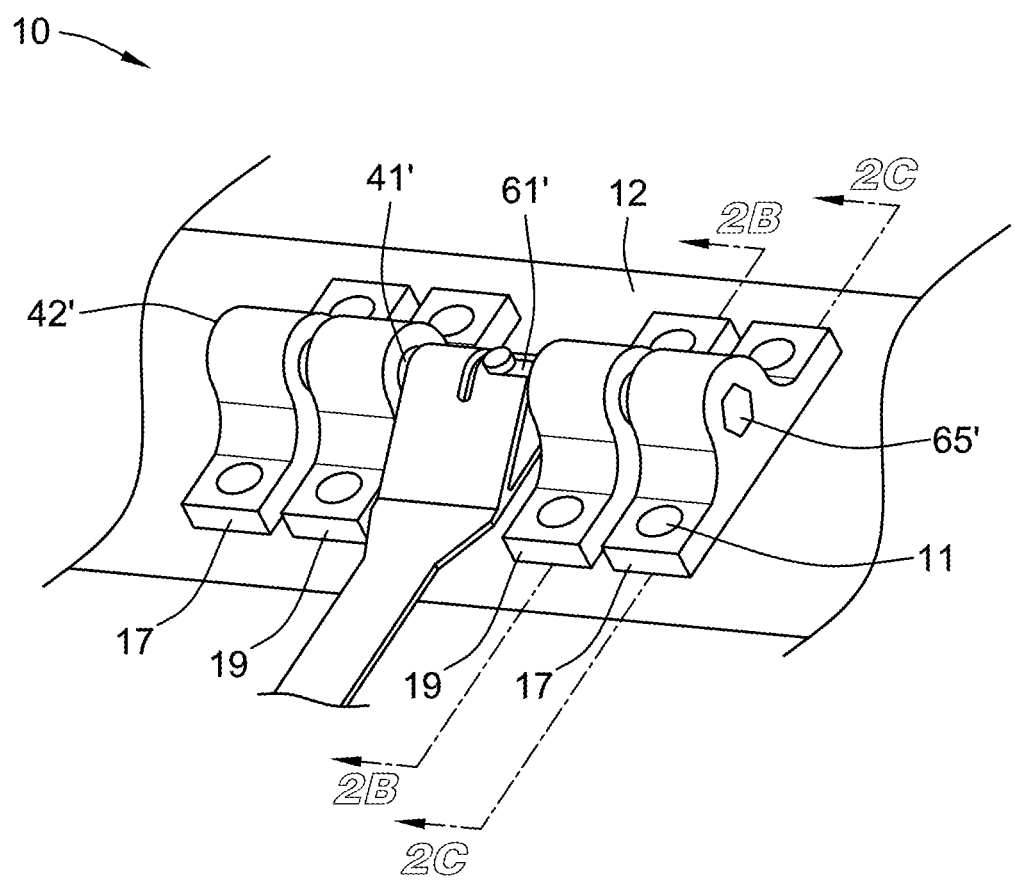
FIG. 2A is a detail view of a second and third force load limiter of the knee bolster system in accordance with another form of the present disclosure.
Figure 2B:
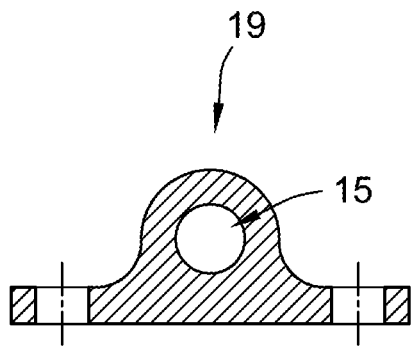
FIG. 2B is a cross-sectional view of a guide bracket of FIG. 2A, taken along line 2B-2B of FIG. 2A.
Figure 2C:
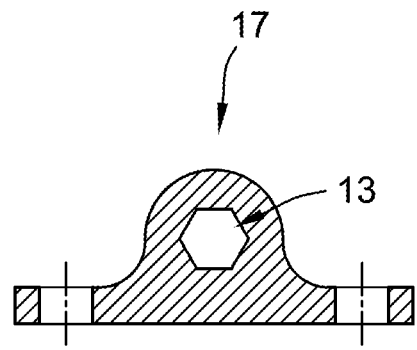
FIG. 2C is a cross-sectional view of a fixture bracket of FIG. 2A, taken along line 2C-2C of FIG. 2A.

In accordance with another form of the present disclosure, FIGS. 2A through 2C illustrate the fixture brackets 17 and guide brackets 19, which are directly attached to the cross member 12 of the vehicle without the clamping straps 18. For example, the fixture brackets 17 and the guide brackets 19 are attached to the cross member 12 through attaching holes 11 by screw members (not shown). Each of the fixture brackets 17 is coupled with a first end 42' of a first rod 41' and the second end 65' of the second rod 61' respectively in a non-rotating manner. As shown in FIG. 2C, for example, the shape of the fixture bracket 17 is a hexagonal shape 13 for fixedly securing with the first and second rods 41', 61' in the non-rotating manner. Accordingly, the first end 42' of the first rod 41' and the second end 65' of the second rod 61' are formed as the same shape (for example, the hexagonal shape) for fitting into the fixture brackets 17. In addition, the guide brackets 19 are directly attached to the cross member 12 of the vehicle as shown in FIG. 2A. The guide brackets 19 are formed as a circular shape 15 for guiding the first rod 41' and the second rod 61' in a rotating manner as shown in FIG. 2B.

FIG. 11 illustrates an operation process 80 of the knee bolster system 10. As shown in FIG. 11(a), when the occupant's knee contacts to the contact plate 30 during the event of the vehicle collision, the contact plate 30 is deformed by an impact force F exerted by the knee impact of the occupant. In FIG. 11(b), the deformation of the contact plate 30 is stopped when the stopper 33 of the contact plate 30 is contacted to the stop pad 28 of the rotational arm 21. After that, in FIG. 11(c), the rotational arm 21 engages with the first rod 41 of the second force load limiter 40, and the rotational arm 21 is rotated by torsional deflection of the first rod 41. After rotational deformation of the first rod 41 with the predetermined angle of the rotational arm 21, as shown in FIGS. 11(d), 12(a) and (b), the rotational movement of the rotational arm 21 is stopped by the engagement between the locking gear 62 and the female locking base 63. Accordingly, the locking gear 62 locks the rotation of the rotational arm 21.

FIG. 13 is a graph 90 of test data showing performance of the knee bolster system 10. As an example, the graph 90 shows the accumulated force load values in each force load limiter of the knee bolster system 10. A force load level 91 shows a stage of FIG. 11(a), in which the deformation of the contact plate 30 is just started. A force load level 92 shows a stage of FIG. 11(b), in which the deformation of the contact plate 30 is stopped due to the stop pad 28 in the first force load limiter 20. A force load level 93 shows a stage of FIG. 11(c), in which the first rod 41 is absorbing the impact energy by torsional deflection in the second force load limiter 40. Finally, A force load level 94 shows a stage of FIGS. 11(d), 12(a) and (b), in which the locking gear locks the rotational movement of the rotational arm 21. Accordingly, the third force load limiter 60 creates a higher torsion force on the rotational arm 21 by accumulation. For example, the preferred ranges of each force load value are 0.5 kN~1.0 kN in the first force load limiter 20, 2.0 kN~4.0 kN in the second force load limiter 40, and 3.0 kN~6.0 kN in the third force load limiter 60.

The foregoing description of various forms of the present disclosure has been presented for purposes of illustration and description. It is not intended to be exhaustive or to limit the present disclosure to the precis forms disclosed. Numerous modifications or variations are possible in light of the above teachings. The forms discussed were chosen and described to provide the best illustration of the principles of the present disclosure and its practical application to thereby enable one of ordinary skill in the art to utilize the present disclosure in various forms and with various modifications as are suited to the particular use contemplated. All such modifications and variations are within the scope of the present disclosure as determined by the appended claims when interpreted in accordance with the breadth to which they are fairly, legally, and equitably entitled.

What is claimed is:

1. A knee bolster system for a vehicle having fixtures, the knee bolster system comprising:
   a first force load limiter including:
      a rotational arm having an upper portion and a lower portion, and
      a contact plate coupled to the lower portion of the rotational arm, the contact plate configured to receive an impact force from an occupant during a collision;
   a second force load limiter including a first rod, a first end of the first rod coupled to the fixture in a non-rotating manner and a second end of the first rod coupled to the rotational arm in a non-rotating manner, the first rod configured to deflect torsionally by allowing relative rotation between the first and second ends of the first rod; and
   a third force load limiter including a locking gear and a female locking base, the locking gear and the female locking base coupled each other in a rotating manner, and the third force load limiter configured to lock the rotational arm after rotation of the first rod in the second force load limiter by a predetermined angle based on rotation of the rotational arm.

2. The knee bolster system of claim 1, wherein a tubular end of the rotational arm includes a first lateral side and a second lateral side, and the tubular end of the rotational arm pivots relative to the fixtures according to a longitudinal axis.

3. The knee bolster system of claim 2, wherein the second end of the first rod is connected to the first lateral side of the rotational arm in a non-rotating manner.

4. The knee bolster system of claim 2, wherein the second lateral side of the rotational arm is formed as the female locking base for coupling with the locking gear protruded from an outer surface of a second rod in the third force load limiter.

5. The knee bolster system of claim 4, wherein a second end of the second rod is connected to the second fixture in a non-rotating manner.

6. The knee bolster system of claim 1, wherein the female locking base includes a groove and the locking gear includes a protrusion.

7. The knee bolster system of claim 6, wherein an engagement of the protrusion and the groove in the third force load limiter prevents further rotation of the rotational arm.

8. The knee bolster system of claim 1, wherein the lower portion of the rotational arm includes a stop pad and the contact plate includes a stopper on a surface faced to the stop pad, and wherein the stop pad is configured for stopping the deformation of the contact plate by contacting with the stopper.

9. The knee bolster system of claim 1, wherein the locking gear and the female locking base each have a circular disk shape, and the locking gear is fixedly attached to a second lateral side of the rotational arm and the female locking base is fixedly attached to the second fixture.

10. The knee bolster system of claim 9, wherein the locking gear includes at least a knob on a first surface of the locking gear, and the female locking base includes at least a hole on a mating surface faced to the first surface of the locking gear.

11. The knee bolster system of claim 10, wherein the knob of the locking gear is inserted into the hole of the female locking base, and a locking receiver includes a narrow channel connected between the holes for increasing a resistance of the rotational movement of the rotational arm.

12. The knee bolster system of claim 1, wherein the knee bolster system is operable to receive the impact force from a knee or knees of the occupant and resist the impact force in three stages corresponding to three force levels including a first level, a second level higher than the first, and a third level higher than the second, wherein in a first stage the first force load limiter deforms to resist the impact force at the first level, wherein in a second stage deformation of the first force load limiter includes deformation of the second force load limiter to provide resistance at the second level, and wherein in a third stage deformation of the first force load limiter induces rotation of the third force load limiter to provide resistance at the third level.

13. The knee bolster system of claim 12, wherein the third force load limiter prevents further rotation of the rotational arm for any forces above the third level.

14. A knee bolster system for a vehicle having fixtures, the knee bolster system comprising:
a first force load limiter including:
    a rotational arm having an upper portion and a lower portion, and
    a contact plate coupled to the lower portion of the rotational arm, the contact plate configured to receive an impact force from an occupant during a collision;
a second force load limiter including a first rod, a first end of the first rod coupled to the fixture in a non-rotating manner and a second end of the first rod coupled to the rotational arm in a non-rotating manner, the first rod configured to deflect torsionally by allowing relative rotation between the first and second ends of the first rod; and
a third force load limiter including a torsional cylinder, the torsional cylinder including a locking gear and a female locking base coupled in a rotational manner and configured to lock the rotational arm after rotation of the first rod in the second force load limiter by a predetermined angle based on rotation of the rotational arm,
wherein the locking gear includes at least a knob and the female locking base includes at least a hole for receiving the knob.

15. The knee bolster system of claim 14, wherein the number of the hole in the female locking base is at least one more than the number of the knob of the locking gear, and the more hole in the female locking base is defined as an extra hole.

16. The knee bolster system of claim 15, wherein a diameter of the extra hole in the female locking base becomes a smaller for stopping the rotation of the locking gear.

17. The knee bolster system of claim 14, wherein each hole is connected by a narrow channel for increasing a resistance when the locking gear is rotated relative to the female locking base.

18. The knee bolster system of claim 14, wherein the knee bolster system is configured for creating a higher torsion force to the rotational arm by accumulating the torsion forces in each force load limiter.

\* \* \* \* \*